United States Patent [19]

Okada et al.

[11] Patent Number: 5,009,758
[45] Date of Patent: Apr. 23, 1991

[54] CLOSED NONCONTINUOUS ELECTRODEPOSITION PAINTING SYSTEM

[75] Inventors: Kenji Okada, Riverview; Hiroshi Ueno, Grosse Ile, both of Mich.

[73] Assignee: Mazda Motor Manufacturing (USA) Corp., Flat Rock, Mich.

[21] Appl. No.: 233,180

[22] Filed: Aug. 16, 1988

[51] Int. Cl.$^5$ .................. G25D 13/24; B05C 11/10
[52] U.S. Cl. ................ 204/180.8; 204/299 EC; 204/300 EC; 427/345; 118/602; 118/603; 118/610
[58] Field of Search ....... 204/180.8, 299 EC, 300 EC; 427/345; 118/602, 603, 610

[56] References Cited

FOREIGN PATENT DOCUMENTS 61-227195 10/1986 Japan .

*Primary Examiner*—John F. Niebling
*Assistant Examiner*—John S. Starsiak, Jr.
*Attorney, Agent, or Firm*—Thompson, Hine & Flory

[57] ABSTRACT

The present invention is a painting and filtration system wherein the system is capable of non-continuous operation, and wherein the system is capable of automatically removing impurities from the filtration system during operation. The system is particularly characterized by utilizing a solvent holding tank associated with a filtration unit, and sensors located in the solvent holding tank which generate signals to a controller which functions to activate and deactive the filtration system and functions to control the flow of liquid throughout the system so that the filtration unit can be cleaned when necessary during operation.

24 Claims, 2 Drawing Sheets

CLOSED NONCONTINUOUS ELECTRODEPOSITION PAINTING SYSTEM

BACKGROUND OF THE INVENTION

1. Field of the Invention

The present invention relates to an electrodeposition painting system, and more particularly, to a closed system including a painting station and one or more rinsing stations, wherein the system includes a filtration unit which provides paint rich components to the painting station and a solvent tank which is connected to the filtration unit and which provides solvent rich fractions to the rinsing stations. The invention is particularly characterized by the utilization of sensors in the solvent tank to generate signals which are used to control the operation of the system.

2. Description of Prior Art

Electrodeposition painting systems, particularly those used for applying a coat of paint onto the external and internal surfaces of an automobile body are known in the art. Examples of such systems are disclosed in Japanese Publication Nos. 57-194016, 57-207200 and 58-123,900. These systems are characterized by submerging an automobile body in an electrolytic bath and then rinsing the body through a series of rinsing stations. These systems are also characterized by the use of a filtration system which is capable of separating the paint contained in the electrolytic bath into paint rich components, typically, pigment, binder and a small amount of solvent, typically water, and solvent rich components, typically water. In use, the paint rich components which are separated in the filtration system are recycled back to the electrolytic tank and are used for painting an automobile body, and the solvent rich components are provided to the rinse stations and are used to rinse the painted automobile body to remove excess paint and solids from the paint which are stuck on the electrodeposited film.

The above painting systems have gained wide acceptance in the automobile industry. However, these systems suffer from a number of drawbacks. In use, the system operates continuously, with paint being continuously supplied to the filtration unit for separation into paint rich and solvent rich. components. The continuous operation of the painting and filtration system results in increased operating costs, particularly at times when automobile body parts are not being painted. For example, the electrodeposited painting process may only be desired for one plane shift, amounting to approximately eight hours. Due to the continuous nature of the system, the filtration unit operates on a 24 hour cycle. Accordingly, unnecessary electrical and other operating costs are incurred as a result of the operation of the filtration system for 16 hours wherein automobile bodies are not being painted.

A further consequence of the filtration system operating on a continuous cycle is that if any of the elements of the system malfunction, the entire system is susceptible to accidental spillage of either water or paint. If such an accident should occur, cleanup costs and costs due to the inability to utilize the painting system will be incurred. Accordingly, the continuous operation of the filtration system poses a potential safety risk as a result of the system being unable to automatically shutdown in advance of accident.

In addition, the filters which are used to separate the paint into paint rich components and solvent rich components are susceptible to fouling by solids contained in the paint, feed. Such solids tend to accumulate throughout the system, and particularly in the filtration unit. If the accumulation of solids reaches a point wherein the filters. are completely clogged, the system has to be manually shut down and the filters have to be washed to remove the solid residue. Again, this results in an increase in cost as a result of cleaning, and production downtime.

Attempts have been made in the art to solve some of these problems, but a solution has not been proposed which can remedy all of the problems.

For example, Japanese Publication No. 61-227195 discloses a filtration device for use in connection with an elctrodeposition bath which is capable of intermittent operation according to the level of water maintained in a solvent holding tank attached to the filtration unit. Although the sensors maintained in the solvent holding tank function to start and stop the filtration unit, the publication does not disclose a solution to the clogging problem caused by the accumulation of paint residue throughout the filtration unit.

Accordingly, there exists a need in the art for an electrodeposition painting system including a filtration unit for separating paint into paint rich and solvent rich components wherein the system is capable of noncontinuous operation, and wherein the filters contained in the filtration unit may be cleaned during operation without incurring additional costs for system downtime.

SUMMARY OF THE INVENTION

The present invention relates to a painting and filtration system wherein the system is capable of noncontinuous operation, and wherein the system is capable of automatically removing impurities from the filtration system during operation. The system is particularly characterized by utilizing a solvent holding tank associated with a filtration unit, and sensors located in the solvent holding tank which generate signals to a controller which functions to activate and deactivate the filtration system and functions to control the flow of liquid throughout the system so that the filtration unit can be cleaned when necessary during operation.

More particularly, three sensors are provided in the solvent holding tank to monitor operation of the inventive system. A first sensor functions to activate the filtration unit to enable paint to be separated into paint rich and solvent rich fractions and to return the solvent rich fractions to the solvent holding tank. This ensures an adequate supply of solvent rich fractions which may be used for rinsing a painted object. A second sensor, located at a liquid level higher than the first sensor functions to remove solvent rich fractions from the solvent holding tank and circulate them through the filtration unit. This prevents the solvent holding tank from accidentally overflowing. In addition, the circulation of the solvent rich fractions through the filtration unit functions to remove accumulated residue from the walls of the filters of the filtration unit and thereby clean the filtration unit during operation. A third sensor, located at a liquid level lower than said second sensor functions to automatically shut the entire system down. This enables the system to be operated on a noncontinuous basis and thereby reduce operating costs.

While the present invention is particularly utilized for the application of a prime coating of paint to the external and internal surfaces of an automobile body, it is envisioned that the system may be utilized to electrolytically deposit a coat of paint on other objects. For example, it is envisioned that the present system may be utilized to electrolytically deposit a coat of paint on any metal object wherein the electrolytic coating is used as a corrosion inhibitor.

Accordingly, one embodiment of the present invention comprises a closed system for use in a noncontinuous paint filtration and separation process wherein paint is separated into paint rich and solvent rich fractions. This system includes:

a paint holding means;

a solvent holding means;

a filtration means for separating paint into a solvent rich fraction and a paint rich fraction, said filtration means being in liquid communication with said paint holding means and said solvent holding means by first, second, third and fourth liquid conveying means; and first, second and third sensor means for sensing the level of solvent in said solvent holding means;

said first sensor means sensing a first level of solvent and generating a first signal, said first signal actuating control means for initiating the flow of paint from said paint holding means through said first liquid conveying means and into said filtration means wherein said paint is separated into paint rich and solvent rich components and wherein said paint rich components flow through said second liquid conveying means to said paint holding means and said solvent rich components flow through said third liquid conveying means to said solvent holding means;

said second sensor means sensing a second level of solvent higher than said first level of solvent and generating a second signal, said second signal actuating control means for stopping the flow of paint through said first liquid conveying means and starting the flow of solvent from said solvent holding means through said fourth liquid conveying means to said filtration means and said second liquid conveying means; and said third sensor means sensing a third level of solvent lower than said second level of solvent and generating a third signal, said third signal actuating control means for stopping the flow of solvent through said fourth solvent conveying means and through said second solvent conveying means.

The inventive filtration and separation system is designed to be incorporated with a paint station which contains an electrolytic paint dip tank and one or more rinse stations. The paint station is used to apply a coat of paint to an object, typically an automobile body.

In another embodiment of the present invention, a process for utilizing the inventive system is disclosed. The process includes the steps of:

a paint holding means;

a solvent holding means;

an excess solvent holding means which is in fluid communication with said solvent holding means;

an excess paint holding means which is in fluid communication with said paint holding means;

one or more rinse station means which are connected to said paint holding means and said excess solvent holding means;

a filtration means for separating paint into a solvent rich fraction and a paint rich fraction, said filtration means being in liquid communication with said paint holding means, said excess paint holding means and said solvent holding means by first, second, third and fourth liquid conveying means; and first, second and third sensor means for sensing the level of solvent in said solvent holding means;

said paint holding means, said rinse station means and said excess solvent holding means being used to apply a coat of paint to an object and rinse excess paint and solids from the object;

said first sensor means sensing a first level of solvent and generating a first signal, said first signal actuating control means for initiating the flow of paint from said excess paint holding means through said first liquid conveying means and into said filtration means wherein said paint is separated into paint rich and solvent rich components and wherein said paint rich components flow through said second liquid conveying means to said paint holding means and said solvent rich components flow through said third liquid conveying means to said solvent holding means;

said second sensor means sensing a second level of solvent higher than said first level of solvent and generating a second signal, said second signal actuating control means for stopping the flow of paint through said first liquid conveying means and starting the flow of solvent from said solvent holding means through said fourth liquid conveying means to said filtration means and said second liquid conveying means; and said third sensor means sensing a third level of solvent lower than said second level of solvent and generating a third signal, said third signal actuating control means for stopping the flow of solvent through said fourth solvent conveying means and through said second solvent conveying means.

The inventive process is performed on a noncontinuous basis, utilizing start and stop signals generated from the sensors located in the solvent holding means. The various start and stop signals are able to prevent the system from an accidental spillage of paint or solvent as a result of component malfunction. In addition, the step of conveying solvent through the filtration unit instead of conveying paint through the filtration unit functions to remove unwanted residue from the filtration unit, and therefore prevent undesired clogging.

Accordingly, it is an object of the present invention to develop a closed paint filtration and separation system which is capable of being operated on a noncontinuous basis.

A further object of the present invention is to provide a filtration and separation system wherein a filtration unit may be cleaned during operation.

An additional object of the present invention is to associate a noncontinuous paint filtration and separation system with a painting assembly capable of painting an object.

It is still a further object of the present invention to provide a filtration and separation process which is capable of being performed on a noncontinuous basis in a closed system.

It is still another object of the present invention to provide a filtration and separation process within a closed system wherein filters contained in a filtration unit are automatically cleaned during operation to remove undesired residue.

Other objects and features of the present invention will become apparent to those skilled in the art when reference is made to the following description taken in conjunction with the accompanying drawings.

DETAILED DESCRIPTION OF THE PREFERRED EMBODIMENT

While describing the preferred embodiments, specific terminology will be utilized for the sake of clarity. It is to be understood that such terminology includes not only the recited embodiments, but all technical equivalents which perform substantially the same function in substantially the same way to obtain the same result.

Figure 1:
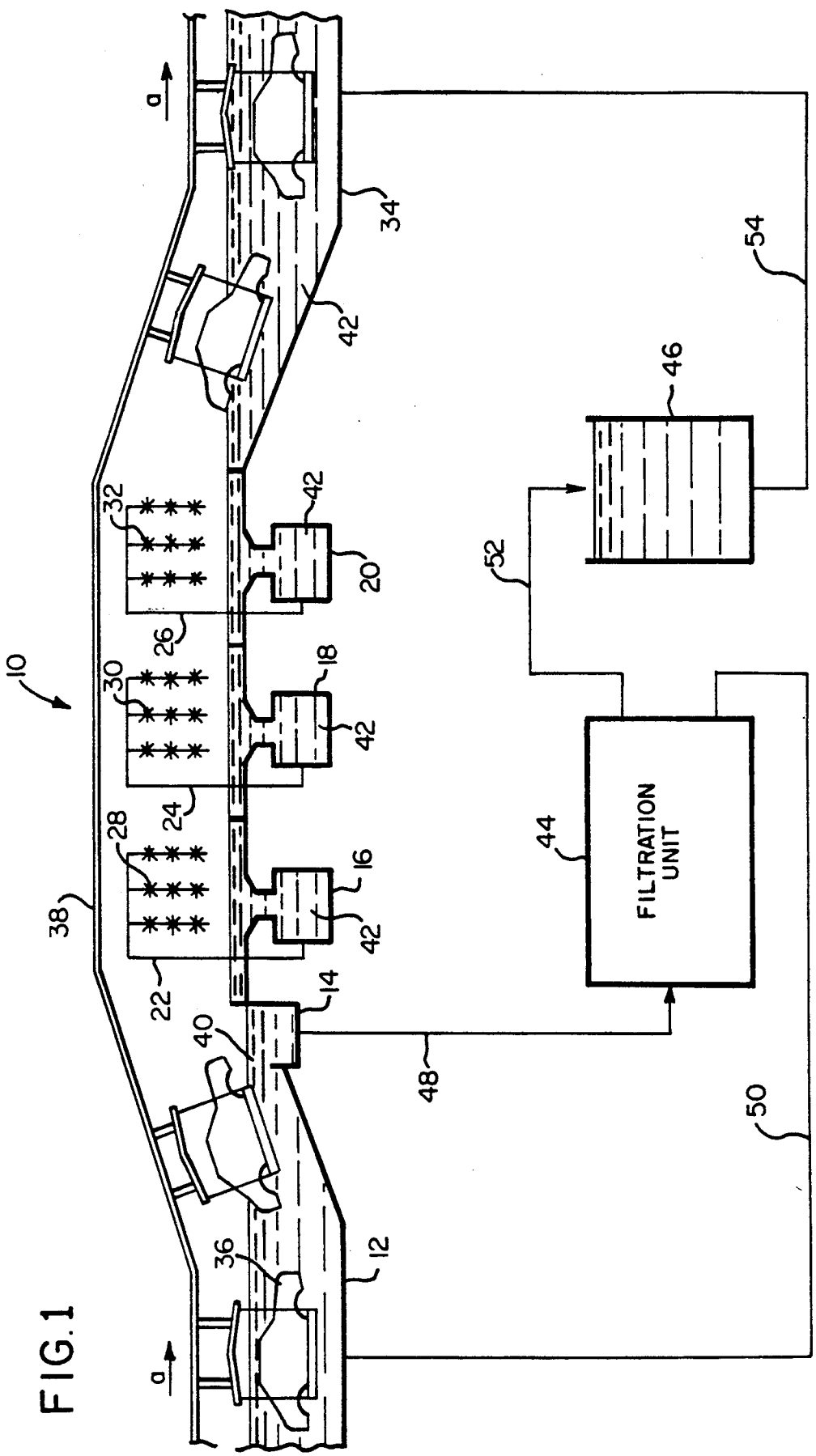
FIG. 1 is a view of a closed system used to electrolytically paint and rinse an object.

Referring now to the drawings, and more particularly to FIG. 1, the basic components of a system used to paint and rinse an object are designated as element 10. System 10 includes paint holding tank 12 which is in fluid communication with paint overflow holding tank 14. Connected to paint overflow holding tank 14 are a series of rinse stations 16, 18 and 20. Connected to rinse stations 16, 18 and 20 by pipes 22, 24 and 26 respectively are rinse sprayers 28, 30 and 32. Connected to rinse station 20 is . solvent dip tank 34.

In use, an object to be painted, such as the external body of an automobile 36 is conveyed, typically by chain conveyor 38, first through paint holding tank 12 so that the external and internal surfaces of the automobile body 36 are immersed in paint 40. Paint 40 is deposited on automobile body 36 preferably by electrodeposition techniques which are known in the art. Paints which are used as a base coat for automobile bodies containing about 20 percent solids are particularly useful. However, any paints which are capable of being separated into paint rich and solvent rich components may be used as will be understood in the art. Conveyor 38 then conveys automobile body 36 through sprayers 28, 30 and 32 in the direction of arrow a wherein the external surface of automobile body 36 is rinsed with a rinsing solvent, typically deionized water 42 which is supplied from rinse stations 16, 18 and 20 by pipes 22, 24 and 26 respectively. The automobile body 36 is then immersed in solvent dip tank 34, which also contains deionized water 42 to remove excess paint and solids from the external and internal surfaces of automobile body 36. This operation is typically utilized when applying by electrodeposition a base coat or prime coat of paint to protect automobile body 36 against corrosion. After automobile body 36 has been immersed in solvent dip tank 34, automobile body 36 is conveyed to a second paint station (not pictured) wherein subsequent coats of paint are applied to the body.

Also shown in FIG. 1 are filtration unit 44 and solvent holding tank 46. Filtration unit 44 is connected to paint overflow holding tank 14 by pipe 48, to paint holding tank 12 by pipe 50, and to solvent holding tank 46 by pipe 52. Solvent holding tank 46 is connected to solvent dip tank 34 by pipe 54. As a result of each of the dip tanks and rinse stations being connected either integrally or via pipes, system 10 is a closed system.

A further characteristic of closed system 10 is that the paint contained in paint overflow holding tank 14 is used to supply paint 40 to paint holding tank 12 and water 42 to solvent dip tank 34. As will be discussed in greater detail with respect to FIG. 2, paint from paint overflow holding tank 14, which contains pigment, binder and a solvent which is primarily water along with minor amounts of low molecular weight species and salts, is introduced to filtration unit 44 through pipe 48 where it is filtered to remove impurities and separated into paint rich components and water rich components. The paint rich components, which contain pigment, binder and a small amount of solvent are returned to paint holding tank 12 by pipe 50. The solvent rich components, which typically constitute deionized water containing a minimal amount of solids, are transferred to solvent holding tank 46 by pipe 52. To use the water contained in solvent holding tank 46 to rinse automobile body 36, the water is transferred from solvent holding tank 46 to solvent dip tank 34 by pipe 54.

Figure 2:
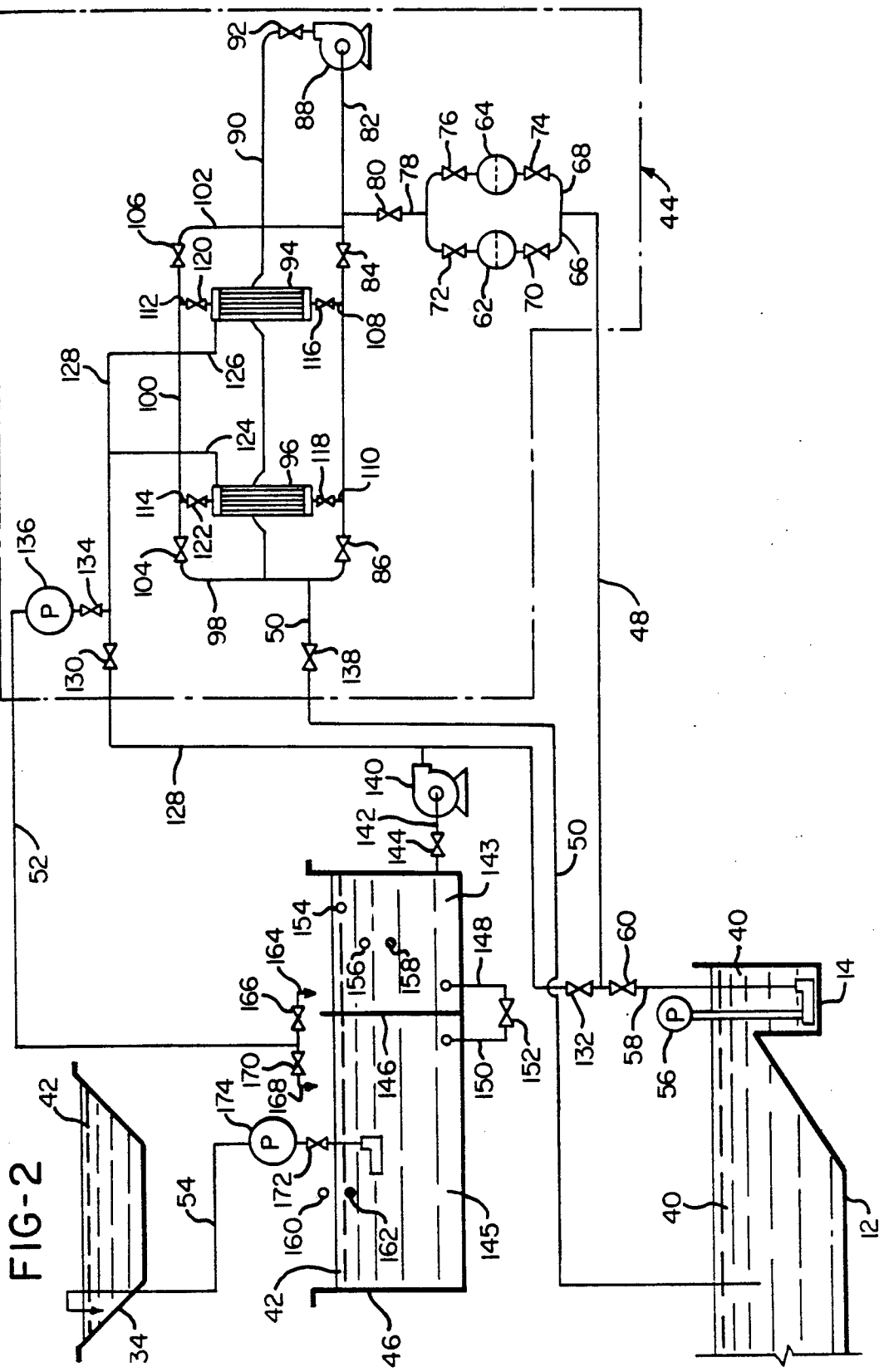
FIG. 2 is a view of a filtration and separation system which embodies the teachings of the instant invention.

Referring now to FIG. 2, paint overflow tank 14, filtration unit 44, and solvent holding tank 46 are shown in greater detail. Paint overflow tank 14, containing paint 40, includes pump 56 which is used to feed paint 40 to filtration unit 44 via pipe 58, which in turn connects to pipe 48. Located on pipe 58 is a valve 60 which functions to regulate the flow of paint 40 through pipe 58, and is automatically activated by a controller (not pictured).

Filtration unit 44 includes a pair of cartridge prefilters 62 and 64 which are connected to pipe 48 by pipes 66 and 68. Pipe 66 contains valves 70 and 72 which are located immediately preceding and following cartridge prefilter 62 and function to control the flow of paint 40 through cartridge prefilter 62. Similarly, pipe 68 contains valves 74 and 76 which function to control the flow of paint 40 through cartridge prefilter 64. Pipes 66 and 68 converge to pipe 78 which contains valve 80. Pipe 78 feeds pipe 82 which contains valves 84 and 86. One end of pipe 82 terminates at pump 88 which is connected at its opposite end to pipe 90 which contains valve 92. Pipe 90 passes behind ultrafilters 94 and 96 and terminates at pipe 98. Pipe 98 connects pipe 82 with pipe 100. At the opposite end of pipe 100 from pipe 98, pipe 102 connects pipe 82 to pipe 100. Located on pipe 100 are valves 104 and 106.

Located between pipes 82 and 100 are ultrafilters 94 and 96 which are connected to pipes 82 and 100 by pipes 108 and 110 and pipes 112 and 114 respectively. Pipes 108, 110, 112 and 114 each contain a valve represented by 116, 118, 120 and 122 respectively. Located at the upper portion of ultrafilters 94 and 96 are pipes 124 and 126, which terminate at pipe 128. Pipe 128 contains valves 130 and 132 and connects with pipe 48 near valve 132. Connected to pipe 128 is pipe 52 which contains valve 134 and pump 136 and is used to deliver water to solvent holding tank 46.

Connected to pipe 98 is pipe 50 containing valve 138. Pipe 50 terminates at paint holding tank 12 and is used to deliver paint rich components to paint holding tank 12. All valves in the filtration unit 44, and in the pipes which are connected to filtration unit 44 are connected to and are automatically opened and closed by controllers (not pictured).

Still referring to FIG. 2, pipe 128 is connected to pump 140, which is connected to pipe 142 which contains valve 144. Pipe 142 is connected at the end opposite to pump 140 to solvent holding tank 46.

Water 42 is maintained in solvent holding tank 46 which has a right chamber 143 and a left chamber 145 which are defined by separator 146. As will be discussed in greater detail with respect to the operation of system 10, right chamber 143 provides water which may be circulated throughout filtration unit 44, and left chamber 145 provides water which may be supplied to solvent dip tank 34 for use in the rinsing of excess paint and solids from a painted object. Connected to both the lower portion of right chamber 143 through pipe 148 and the lower portion of left chamber 145 through pipe 150 is valve 152.

Contained within right chamber 143 are sensors 154, 156 and 158 and contained within left chamber 145 are sensors 160 and 162. Sensors 154, 156, and 158 sense the liquid level of water in right chamber 143 and sensors 160 and 162 sense the liquid level of water in left chamber 145. In right chamber 143 sensor 154 senses a highest level of liquid, sensor 156 senses an intermediate level of liquid, and sensor 158 senses a lowest level of liquid. In left chamber 145, sensor 160 senses a highest level of liquid and sensor 162 senses a lowest level of liquid.

Referring to the top of solvent holding tank 46, pipe 52 terminates in a "T" type connection with pipe 164, containing valve 166, and with pipe 168, containing valve 170. Pipes 164 and 168 discharge water 42 to the top of right chamber 143 and to the top of left chamber 145 respectively.

Pipe 54 originates in left chamber 145 and contains valve 172. Pipe 54 contains pump 174 which displaces water 42 from solvent holding tank 46 through pipe 54 and discharges it into solvent dip tank 34. As is the case with filtration unit 44, all valves associated with solvent holding tank 46 are connected to and are automatically opened and closed by controllers (not shown).

Throughout system 10, all pumps and valves are automatically operated by a control system, typically a computer control system which responds to electronic signals generated from sensors located throughout system 10. The control system is operated in a manner well known in the art and the electronic circuitry used to link the control system to the various elements is well known and not pictured.

Still referring to FIG. 2, the interaction of the components to perform the various filtering, separating, filter cleaning, starting and stopping operations is now set forth. In an initial state, water 42 is contained in solvent holding tank 46 and solvent dip tank 34 and paint 40 s contained in paint holding tank 12 and paint overflow holding tank 14. When the water level in solvent holding tank 46 is at a level located between sensors 160 and 162, the filtration unit is in a deactivated state.

As water is depleted from solvent dip tank 34 as a result of dipping an automobile body through solvent dip tank 34, it must be replenished. Pump 174 is activated and valve 172 is automatically opened and water is discharged from solvent holding tank 46 through pipe 54 and valve 172, to solvent dip tank 34. This causes the water level in solvent holding tank 46 to lower. When the water level reaches the level sensed by liquid level sensor 162, filtration unit 44 is automatically activated as follows.

Pump 56, preferably a vertical centrifugal pump having a flow capacity of approximately 300 gallons per minute, is actuated and displaces paint 40 from paint overflow tank 14 through pipe 58 and valve 60 which has been automatically opened and through pipe 48. Paint 40 then flows through pipes 66 and 68 and through valves 70 and 74, which have been automatically opened and through prefilters 62 and 64. Prefilters 62 and 64 are utilized to filter solid impurities from paint 40. In the preferred embodiment, prefilters 62 and 64 contain 50 micron filter cartridges which are used to trap all solid impurities which are greater than 50 microns in diameter. The filtered paint the passes through valves 72 and 76, through pipe 78 and through valve 80 which has been automatically opened.

Pump 88, preferably a horizontal centrifugal pump having a flow having a flow capacity of approximately 1550 gallons per minute, is then activated to displace paint 40 though pipe 82 and through pipe 90 and valve 92 which has automatically been opened. Paint 40 flows through pipe 90, and downward through pipe 98.

To prevent paint 40 from inadvertently escaping filtration unit 44 prior to separation into paint rich and water rich components, valve 138 is automatically maintained in a closed position. Paint 40 then passes through valve 86 which has been opened and through pipe 82 whereupon it reaches the bottom of ultrafilters 94 and 96.

Paint 40 then passes through pipes 108 and 110 and valves 116 and 118 and into ultrafilters 94 and 96 where it travels from bottom to top. Ultrafilters 94 and 96 consist of a number of hollow fiber ultrafiltration cartridges mounted on stainless steel inlet and outlet manifolds. Such ultrafilters are commercially available from Romicon, Inc., and the cartridges function as a membrane which enables paint 40 to separate into paint rich components and water rich components. The inner surfaces of the hollow fiber membranes have an extremely fine porosity which allows water, low molecular weight species and salts to pass through as permeate. High molecular weight paint rich components are retained in the membranes along with a slight amount of water, low molecular weight species and salts.

The paint rich components are removed from the top of ultrafilters 94 and 96 through pipes 112 and 114 and valves 120 and 122 and flow into pipe 100. The paint rich components traverse pipe 100 in a direction opposite to the location of valve 106, valves 86 and 106 are automatically closed, and the paint rich components pass through valve 104 and into pipe 98. Valve 138 is then automatically opened and the paint rich components pass through valve 138 and pipe 50 and are ultimately discharged in paint holding tank 12.

The water rich components are removed from ultrafilters 94 and 96 through lines 124 and 126 and through line 128. Valve 130 is automatically maintained in a closed position to prevent the water rich components from being discharged to paint overflow tank 14. Valve 134 is automatically opened and pump 136 is activated to displace the water rich components through pipe 52. Valves 166 and 170 are automatically opened and the water rich components are discharged in solvent holding tank 46 through pipes 164 and 168.

The addition of water rich components to solvent holding tank 46 causes the water level in solvent holding tank 46 to rise. However, because the painting and rinsing of the automobile body as described above with respect to FIG. 1 is being performed simultaneously, the water level does not rapidly rise. Rather, in practice, it is preferred that the system operate in this mode, with filtration unit 44 separating paint into paint rich and water rich components while the painting and rinsing of the automobile body is being performed.

If, however, the water level in solvent holding tank 46 rises to a level which is sensed by sensor 160, it is necessary to remove water from solvent holding tank 46 to prevent an undesired spillage of water 42 caused by overflow. To reduce the water level in solvent holding tank 46, sensor 160 generates a signal which is sent to a controller, and the controller automatically closes valve 134 and automatically opens valve 152. Pump 56 is then deactivated, valve 60 is automatically closed and valve 80 is automatically closed. After a short period of time, about 10 seconds, pump 140, preferably a horizontal centrifugal pump having a flow capacity of about 50 gallons per minute, is activated, valve 144 is automatically opened and valve 80 is opened. The activation of pump 140 causes water 42 to be removed from solvent holding tan.k 46 through pipe 142 and displaced through pump 140 to pipe 128. Water 42 travels through pipe 128 and valve 132 until water 42 reaches pipe 48. Water 42 does not improperly discharge to excess paint supply tank 14 as a result of valve 60 being closed.

Water 42 flows through pipe 48 and into filtration unit 44 using a similar cycle as the cycle used to separate paint 40 into paint rich and water rich components. Water 42 passes through prefilters 62 and 64, and through valve 80 to pipe 82. Pump 88 displaces water 42 through pipe 90 and into pipe 98. Valve 86 automatically opens to enable water to gain access to the bottom of ultrafilters 94 and 96 through pipes 108 and 110. Water 42 passes through ultrafilters 94 and 96 and accumulates at the top of ultrafilters 94 and 96. Water 42 is removed from ultrafilters 94 and 96 through pipes 112 and 114, and travels through pipe 100, valve 104 and pipe 98. Valve 138 is automatically opened, valve 86 is automatically closed and water 42 passes through valve 138 and pipe 50 whereupon it is discharged to paint holding tank 12. Because valve 134 is maintained in a closed position, water 42 is not displaced to solvent holding tank 46, thus lowering the level of water 42 in solvent holding tank 46.

In addition to lowering the level of water in solvent holding tank 46, the cycling of water 42 through filtration unit 44 functions to clean the pipes and filters by removing paint residue from the interior surfaces of these elements and recycling the removed residue to paint holding tank 12.

As a result of the water removal from solvent holding tank 46, the level of water lowers in solvent holding tank 46 until it reaches a level sensed by sensor 154. Sensor 154 generates a signal to a controller which causes the flow of water 42 from solvent holding tank 46 to ultrafilters 94 and 96 to reverse. Valve 152 automatically closes to prevent right chamber 143, having a volume of approximately 400 gallons from being in fluid communication with left chamber 149, having a volume of approximately 1200 gallons, and to restrict the supply of water to filtration unit 44 to be provided from right chamber 143. Valve 132 automatically closes, valve 80 automatically closes, and valve 130 automatically opens. Water is displaced through valve 144 and pipe 142 by pump 140 and is pumped through pipe 128 and valve 130. Water 42 is then distributed to the top of ultrafilters 94 and 96 through lines 124 and 126.

Water 42 passes downwardly through ultrafilters 94 and 96 and through pipes 108 and 110 and into line 82. Water 42 then passes through valve 84 and is displaced through pump 88. Valve 92 automatically opens and water 42 travels through valve 92 and pipe 90. Valve 86 is automatically closed and water travels through pipe 98 and through valve 138 and into pipe 50, which discharges water 42 into paint holding tank 12.

In addition to lowering the water level in solvent holding tank 46, the reverse flow of water through ultrafilters 94 and 96 additionally acts to clean the hollow fibers in ultrafilters 94 and 96 by removing any debris which may adhere to the inner walls of the fibers.

The level of water in right chamber 143 continues to lower until it reaches a level sensed by sensor 156. Sensor 156 generates a signal to a controller to cause filtration unit 44 to retain water throughout ultrafilters 94 and 96, and pipes 82, 90, 98, 100 and 102 by the automatic shutting off of pump 88, and the automatic closing of valves 92 and 138. Water continues to be supplied to filtration unit 44 via pipes 128, 124 and 126. The level of water continues to lower in right chamber 142 until it reaches a level sensed by sensor 158. Sensor 158 generates a signal to a controller to deactivate filtration unit 44 by automatically deactivating pump 140 and automatically closing valve 130. The amount of water 42 removed from right chamber 143 represented by the lowering of water 42 from the level at sensor 156 to the level at sensor 158 is approximately equivalent to the liquid capacity of filtration unit 44. In the preferred embodiment, this capacity is approximately 50 gallons.

At this stage, ultrafilters 94 and 96 are full of water and remain in this state until the production of water rich components is desired.

The automatic shut off generated by sensor 158 enables system 10 to be operated on a noncontinuous basis. This is particularly preferred in comparison to prior art systems which operate continuously and therefore incur increased operating costs. By comparison, in maintaining a noncontinuous system, operating costs are significantly reduced. This is particularly important when it is not desired to paint and rinse an object and hence, when it is not required to produce water rich components.

In addition, the substitution of water for paint in filtration unit 44 when sensor 160 senses that the water level is relatively high prevents solvent holding tank from accidentally overflowing. This preventative feature of the inventive system saves costs by eliminating any potential costs in cleaning up an accidental spillage and significantly saves costs by allowing the painting of objects to continue without the risk of a system breakdown.

Further, the substitution of water for paint in filtration unit 44 functions to continuously clean the elements of the filtration unit and thereby prevent the clogging of pipes and filters throughout the filtration unit. This too is a significant advance over prior art systems which would be susceptible to breakdowns as a result of the accumulation of paint throughout the filtration unit, particularly the filters, and ultimate clogging of the filters.

In short, the inventive system is capable of painting an object, typically an automobile body, is completely closed, and is designed to maximize cost savings and maximize the prevention of accidents and system breakdown.

Having described the invention in detail and by reference to preferred embodiments thereof, it will be apparent that modifications and variations are possible without departing from the scope of the invention defined in the appended claims.

What is claimed is:

1. A closed system for use in a noncontinuous paint filtration and separation process wherein paint is separated into paint rich and solvent rich fractions, said system comprising:
   a paint holding means (12);
   a solvent holding means (46);

a filtration means (44) for separating paint into a solvent rich fraction and a paint rich fraction, aid filtration means (44) being in liquid communication with said paint holding means (12) and said solvent holding means (46) by first (48), second (50), third (52), fourth (128) and fifth (142) liquid conveying means; and first (162), second (160), third, (158), fourth (154) and fifth (156) sensor means for sensing the level of solvent in said solvent holding means (46);

said first sensor means (162) sensing a first level of solvent and generating a first signal, said first signal actuating control means for initiating the flow of paint from said paint holding means (12) through said first liquid conveying means (48) and into said filtration means (44) wherein said paint is separated into paint rich and solvent rich components and wherein said paint rich components flow through said second liquid conveying means (50) to said paint holding means (12) and said solvent rich components flow through said third liquid conveying means (52) to said solvent holding means (46);

said second sensor means (160) sensing a second level of solvent higher than said first level of solvent and generating a second signal, said second signal actuating control means for stopping the flow of paint through said first liquid conveying means (48) and starting the flow of solvent from said solvent holding means (46) through said fourth liquid conveying means (128) to said filtration means (44) and said second liquid conveying means (50);

said third sensor means (158) sensing a third level of solvent lower than said second level of solvent and generating a third signal, said third signal actuating control means for stopping the flow of solvent through said fourth liquid conveying mean s(128) and through said second liquid conveying means (50);

said fourth sensor means (154) sensing a fourth level of solvent lower than said second level of solvent and higher than said third level of solvent and generating a fourth signal, said fourth signal actuating control means for stopping the flow of solvent through said fourth liquid conveying means (128) and starting the flow of solvent from said solvent holding means (46), through said fifth liquid conveying means, through said filtration means (44) and through said second liquid conveying means (50); and said fifth sensor means (156) sensing a fifth level of solvent lower than said fourth level of solvent and higher than said third level of solvent and generating a fifth signal, said fifth signal actuating control means for stopping the flow of solvent through said second liquid conveying means (50).

2. The system according to claim 1 further comprising:

excess solvent holding means (34); and sixth liquid conveying means (54) for enabling said solvent holding means (46) to be in fluid communication with said excess solvent holding means (34).

3. The system according to claim 2 further comprising one or more rinse station means (16, 18, 20) for rinsing an object which is painted, said rinse station means (16, 18, 20) being connected to said paint holding means (12) and said excess solvent holding means (34) and wherein said paint holding means (12), said rinse station means (16, 18, 20) and said excess solvent holding means (34) are used to apply a coat of paint to an object and rinse excess paint from the object.

4. The system according to claim 3 wherein the object which is painted comprises the external body of an automobile.

5. The system according to claim 1 wherein said filtration means includes one or more ultrafilters.

6. The system according to claim 5 wherein said ultrafilters are capable of separating paint into paint rich and solvent rich fractions.

7. The system according to claim 6 wherein the flow of liquid through said ultrafilters may be reversed.

8. The system according to claim 6 wherein said filtration means additionally comprises prefilter means for filtering large solid impurities from said paint before said paint passes through said ultrafilters.

9. The system according to claim 1 wherein said solvent holding means (46) includes separator means (146) for separating said solvent holding means (46) into a first chamber (143) and a second chamber (145).

10. The system according to claim 9 wherein said solvent holding means (46) further comprises seventh liquid conveying means (148, 150) for enabling said first chamber (143) to be in fluid communication with said second chamber (145).

11. The system according to claim 10 further comprising flow regulation means (152) for regulating the flow of solvent through said seventh liquid conveying means (150, 148).

12. The system according to claim 11 wherein said flow regulation means comprises a valve which is opened in response to said first signal and closed in response to said fourth signal.

13. The system according to claim 9 wherein said third (52) and fifth (142) liquid conveying means are connected to said first chamber (143).

14. The system according to claim 13 wherein said first (162) and second (160) sensor means are located in said second chamber (145) and said third (158), fourth (154) and fifth (156) sensor means are located in said first chamber (143).

15. The system according to claim 1 further comprising excess paint holding means (14); wherein said excess paint holding means (14) is in fluid communication with said paint holding means (12) and wherein said first liquid conveying means (48) is connected to said excess paint holding means (14).

16. A closed system for use in a painting process, said system comprising:

a paint holding means (12);

a solvent holding means (46);

an excess solvent holding means (34) which is in fluid communication with said solvent holding means (46)

an excess paint holding means (14) which is in fluid communication with said paint holding means (12);

one or more rinse station means (16, 18, 20) which are connected to said paint holding means (12) and said excess solvent holding means (34);

a filtration means (44) for separating paint into a solvent rich fraction and a paint rich fraction, said filtration means being in liquid communication with said paint holding means (12), said excess paint holding means (14) and said solvent holding means (46) by first (48), second (50), third (52), fourth (128) and fifth (142) liquid conveying means; and first (162), second (160), third (158), fourth (154) and fifth (156) sensor means for sensing the level of solvent in said solvent holding means (46);

said paint holding means (12), said rinse station means (16, 18, 20) and said excess solvent holding means (34) being used to apply a coat of paint to an object and rinse excess paint and solids from the object;

said first sensor means (162) sensing a first level of solvent and generating a first signal, said first signal actuating control means for initiating the flow of paint from said excess paint holding means (14) through said first liquid conveying means (48) and into said filtration means (44) wherein said paint is separated into paint rich and solvent rich components and wherein said paint rich components flow through said liquid conveying means (50) to said paint holding means (12) and said solvent rich components flow through said third liquid conveying means (52) to said solvent holding means (46);

said second sensor means (160) sensing a second level of solvent higher than said first level of solvent and generating a second signal, said second signal actuating control means for stopping the flow of paint through said first liquid conveying means (48) and starting the flow of solvent from said solvent holding means (46) through said fourth liquid conveying means (128) to said filtration means (44) and said second liquid conveying means (50); and said third sensor means (158) sensing third level of solvent lower than said second level of solvent and generating a third signal, said third signal actuating control means for stopping the flow of solvent through said fourth liquid conveying means (128) and through said second liquid conveying means (50);

said fourth sensor means (154) sensing a fourth level of solvent lower than said second level of solvent and higher than said third level of solvent and generating a fourth signal, said fourth signal actuating control means for stopping the flow of solvent through said fourth liquid conveying means (128) and starting the flow of solvent from said solvent holding means (46), through said fifth liquid conveying means, through said filtration means (44) and through said second liquid conveying means (50); and said fifth sensor means (156) sensing a fifth level of solvent lower than said fourth level of solvent and higher than said third level of solvent and generating a fifth signal, said fifth signal actuating control means for stopping the flow of solvent through said second liquid conveying means (50).

17. The system according to claim 16 wherein the object which is painted comprises the external body of an automobile and wherein said external body is painted by an electrideoisutuib technique.

18. A closed, noncontinuous process for separating and filtering paint into paint rich and solvent rich components by using paint holding means, solvent holding means and filtration means, said process comprising the steps of:

(a) sensing a first level of solvent in said solvent holding means and conveying paint from said paint holding means to said filtration means and filtering said paint to separate it into paint rich and solvent rich components;

(b) conveying said paint rich components to said paint holding means and conveying said solvent rich components to said solvent holding means;

(c) sensing a second level of solvent in said solvent holding means higher than said first level of solvent and stopping the flow of paint through said filtration means and conveying solvent from said solvent holding means to said filtration means, through said filtration mean sand to said paint holding means;

(d) sensing a third level of solvent in said solvent holding means lower than said second level of solvent and stopping the flow of solvent from said solvent holding means to said filtration means and from said filtration means to said paint holding means;

(e) sensing a fourth level of solvent in said solvent holding mean slower than said second level of solvent and higher than said third level of solvent and reversing the flow of solvent through said filtration means and conveying said solvent through said filtration means and to said paint holding means; and (f) sensing a fifth level of solvent in said solvent holding means lower than said fourth level of solvent and higher than said third level of solvent and stopping the flow of solvent from said filtration means to said paint holding means;

wherein steps (a)-(f) are performed in response to signals generated from sensors located in said solvent holding means which sense the level of solvent in said solvent holding means wherein steps (e) and (f) are performed prior to step (d).

19. The process according to claim 18 wherein said filtration means comprises one or more ultrafilters.

20. The process according to claim 19 wherein said step of filtering said paint additionally comprises prefiltering said paint to remove large solid impurities before conveying said paint to said ultrafilters.

21. The process according to claim 18 wherein said paint holding means is used as a tank in which an object to be painted is passed through.

22. The process according to claim 21 wherein said process comprises the additional step of conveying solvent to an excess solvent holding means, said excess solvent holding means being connected to said paint holding means; and wherein said excess solvent means is used as a tank for rinsing excess paint from an object which has passed through said paint holding means.

23. The process according to claim 22 wherein the object which is painted and rinsed comprises the external body of an automobile.

24. The process according to claim 18 wherein said step of reversing the flow of solvent removes paint residue from the walls of said ultrafilters.

* * * * *